United States Patent [19]

Wietrzyk

[11] 4,139,189
[45] Feb. 13, 1979

[54] BLOCK CENTERS

[76] Inventor: Paul J. Wietrzyk, 1617 Wood St., N. Rear, Chicago, Ill. 60622

[21] Appl. No.: 857,292

[22] Filed: Dec. 5, 1977

[51] Int. Cl.² .............................................. B25B 1/24
[52] U.S. Cl. ................................... 269/272; 269/287; 269/321 N
[58] Field of Search ....... 269/41, 42, 321 N, 126–129, 269/259, 264, 271, 277, 272, 265, 134, 137, 287; 408/103

[56] References Cited

U.S. PATENT DOCUMENTS

| 468,272 | 2/1892 | Watt | 269/272 |
|---|---|---|---|
| 3,218,059 | 11/1965 | Andrew | 269/271 |
| 4,061,321 | 12/1977 | Farr | 269/41 |

Primary Examiner—Robert C. Watson
Attorney, Agent, or Firm—Charles A. Laff; J. Warren Whitesel; Howard B. Rockman

[57] ABSTRACT

A pair of V block centers, for being used with a conventional V block, in order to support and center any rectangular stock upon the V block, while being machined; the pair of V block centers each consisting of an elongated rectangular bar, which has one of its longitudinal corners cut out to form an inside square corner, in which a rectangular work piece is positioned, an opposite longitudinal corner of the bar being cut off at a forty-five degree angle, in order to rest against the angular face of the conventional V block, the V block centers thus supporting the work therebetween, while a conventional V block clamp then holds the work secure therein.

2 Claims, 4 Drawing Figures

BLOCK CENTERS

This invention relates generally to machine shop tools.

More specifically, it relates to a V block accessory.

It is generally well known, to those persons who are skilled with machine shop practice, that a conventional V block is designed for retaining and centering round stock, and it is not adaptable for retaining and centering rectangular or square stock. This situation is, of course, therefore, in want of an improvement.

Accordingly, it is a principal object of the present invention to provide a pair of V block centers, that can be used with V blocks, in order to clamp any square or rectangular stock within the V block, so that it may be easily machined or ground.

Another object of the present invention is to provide a pair of V block centers, which permits a square or rectangular stock workpiece to have faces machined, or ground parallel to the V block square sides.

Yet a further object is to provide a pair of V block centers, which center a square or rectangular workpiece in the V block.

Yet another object is to provide a pair of V block centers, which, in a modified design thereof, are adaptable to hold workpieces which are relatively thin.

Other objects are to provide a pair of V block centers which are simple in design, inexpensive to manufacture, rugged in construction, easy to use and efficient in operation.

These, and other objects, will be readily evident, upon a study of the following specification, and the accompanying drawing, wherein.

Figure 1:
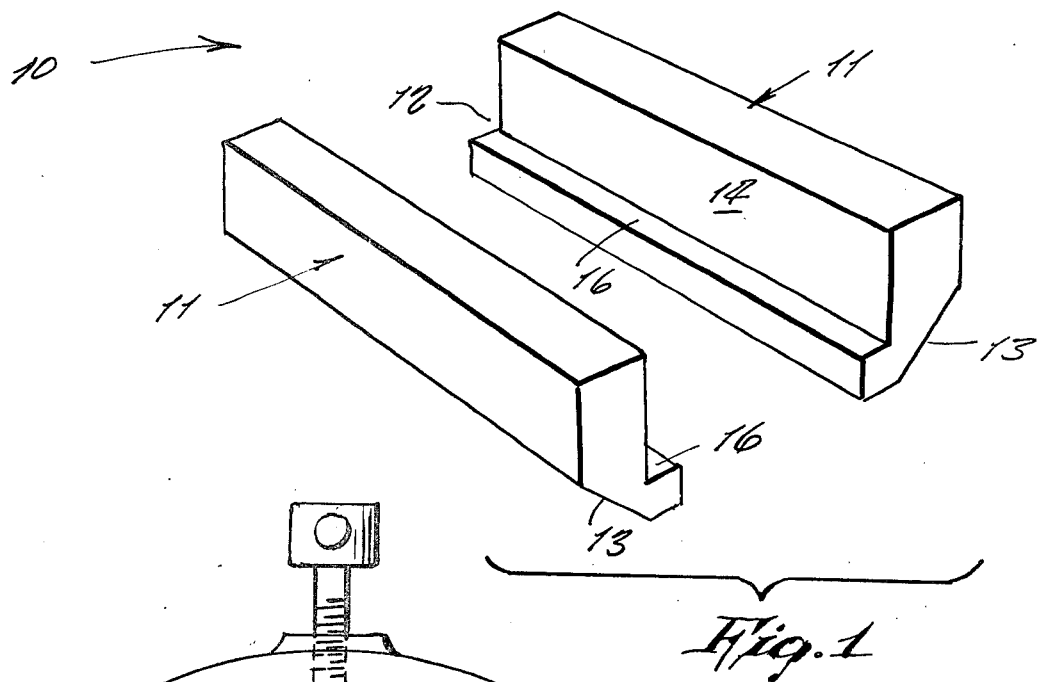
FIG. 1 is a perspective view of a pair of V block centers, comprising of the present invention.
Figure 2:
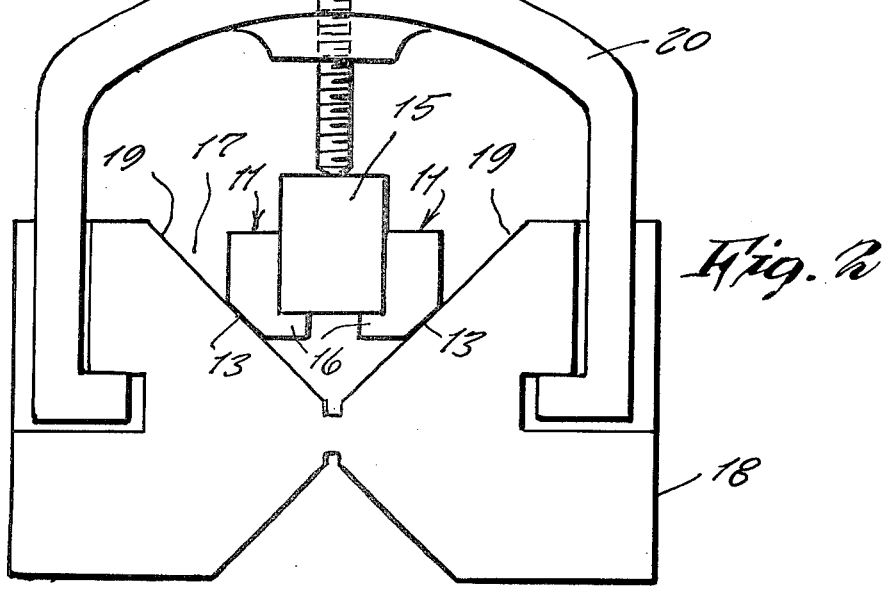
FIG. 2 is an end view of a conventional V block, and illustrating the present invention incorporated therewith, for retaining a square or rectangular workpiece.

Referring now to the drawing in greater detail, and more particularly, to FIGS. 1 and 2 thereof at this time, the reference numeral 10 represents a pair of V block centers, according to the present invention, wherein the same is comprised of two bars 11, both of which are a same in shape. Each bar 11 is made from an elongated, rectangular block of steel, in which one elongated corner is machined off, so as to form a square inside corner 12, in which the sides of the inside corner are parallel to the outside faces of the block. An opposite longitudinal corner of the block is machined off, so as to form a face 13, which is at forty-five degrees angle respective to the outside faces remaining on the block.

Thus, each bar 11 includes a side wall 14, against which a workpiece 15 is placed, and the bar includes a foot 16, on top of which the workpiece rests.

In operative use, the bars are placed inside a V groove 17 of a V block 18, with each bar resting with its angular side 13 resting upon the correspondingly angular surface 19 of the V groove 17. The workpiece 15 is placed between the bars or V block centers, as clearly shown in FIG. 2. After this position, the V block clamp 20 is screwed down upon the workpiece, thus rigidly securing the workpiece in a precisely centered position over the center of the V groove 17. The workpiece is now correctly placed for being properly machined or ground.

Figure 3:
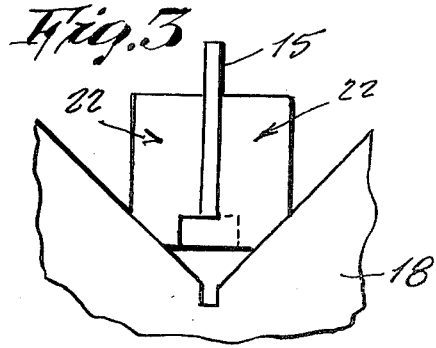
FIG. 3 is a fragmentary end view, similar to FIG. 2, and illustrating a modified design of the invention, so as to retain a relatively thin workpiece.
Figure 4:
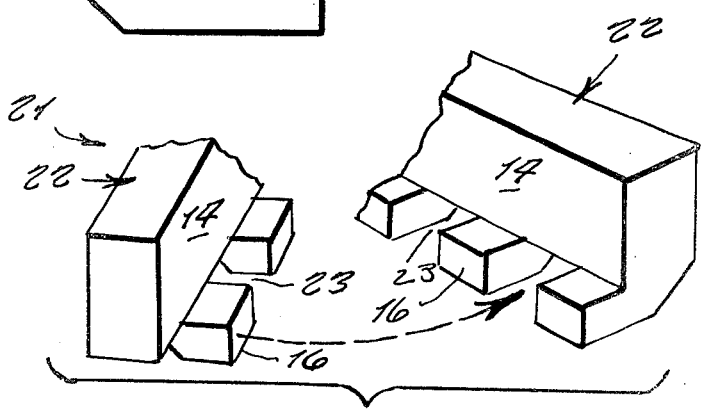
FIG. 4 is a fragmentary perspective view of the V block centers illustrated in FIG. 3.

In a modified design of the invention, shown in FIGS. 3 and 4, a pair of V block centers 21 are comprised of bars 22, which are a same as the above described bars 11, except that, in this design, the feet 16 of each bar is transversely slotted with slots 23, so that the feet of the two bars can be readily interfitted together, thus permitting the sides 14 of the bars being able to be brought closer together, so that the V block centers 21 are thus adaptable for clamping against relatively thinner workpieces, such as shown in FIG. 3. Thus, a modified design is provided.

While various changes may be made in the detail construction, it is understood that such changes will be within the spirit and scope of the present invention, as is defined by the appended claims:

What I now claim is:

1. A pair of V-block centers for use in conjunction with a conventional V-block, comprising, in combination, a pair of elongated bars, each having a cross section with a modified generally rectilinear cross section, each of said bars having one longitudinal corner of said cross section cut square along one edge to form an inside corner between a vertical wall and a sidewardly projecting foot extending therefrom, an opposite longitudinal corner of the cross section of said bar being cut off along another edge at a forty-five degree angle for resting on a forty-five degree inclined pair of surfaces of a V-groove of a V-block, whereby said bars may be positioned in a spaced-apart, parallel relationship and rest upon said angular surfaces of said V-block, a workpiece being positioned between said bars for being held therebetween, while a V-block clamp bears against said workpiece to hold them against said bars of said V-block centers, each of said elongated bars having a plurality of spaced-apart, transverse grooves on said sidewardly-extending foot, said foot of said two V-shaped block centers interfitting together to clamp a relatively thin workpiece.

2. A V-block, clamp and center support comprising a V-block including a centrally disposed longitudinal groove having a pair of generally 45° side walls extending along the length of said blocks, an inverted, somewhat U-shaped V-block clamp means straddling said groove and making firm mechanical connection to said block at the outer ends of said U-shape, screw means threaded through the center of said U-shape and positioned to advance toward or back away from the root of said V-groove, a pair of center blocks for extending lengthwise over a substantial portion of the length of said V-groove, each of said center blocks including a 45° surface for resting upon a corresponding side wall of said V-groove, and a generally L-shaped groove on said center blocks opposite the 45° surface of said block whereby the two L-shapes on said pair of center blocks form a generally rectangular space when the two center blocks are in position in said groove with said screw means poised over the center of said rectangular space, whereby said rectangular space has an adjustable width depending upon how high the center blocks are resting upon the V-groove.

* * * * *